United States Patent
Burcham et al.

(10) Patent No.: US 10,645,531 B1
(45) Date of Patent: May 5, 2020

(54) ROUTE BUILDING ENGINE TUNING FRAMEWORK

(71) Applicant: Spring Communications Company L.P., Overland Park, KS (US)

(72) Inventors: Robert H. Burcham, Overland Park, KS (US); Naseer A. Dari, Kansas City, KS (US); Matthew Habiger, Kansas City, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/398,254

(22) Filed: Apr. 29, 2019

(51) Int. Cl.
*H04W 4/024* (2018.01)
*H04W 4/021* (2018.01)

(52) U.S. Cl.
CPC ........... *H04W 4/024* (2018.02); *H04W 4/021* (2013.01)

(58) Field of Classification Search
CPC .... H04W 4/024; H04W 4/021; G08G 1/0125; G08G 1/0141; G08G 1/0145
See application file for complete search history.

(56) References Cited

U.S. PATENT DOCUMENTS

| | | |
|---|---|---|
| 8,391,836 B1 | 3/2013 | Bolot et al. |
| 8,589,318 B2 | 11/2013 | Sundararajan et al. |
| 9,122,693 B2 | 9/2015 | Blom et al. |
| 9,171,461 B1 | 10/2015 | Dabell |
| 9,326,096 B1 | 4/2016 | Gatmir-Motahari et al. |
| 9,710,873 B1 | 7/2017 | Hill |
| 10,332,151 B2 | 6/2019 | Megdal |
| 10,469,981 B1 | 11/2019 | Dannamaneni et al. |
| 10,555,130 B1 | 2/2020 | Burnham et al. |
| 2002/0188550 A1 | 12/2002 | Swartz et al. |
| 2004/0254698 A1 | 12/2004 | Hubbard et al. |
| 2006/0100956 A1 | 5/2006 | Ryan et al. |

(Continued)

FOREIGN PATENT DOCUMENTS

GB 2516513 A 1/2015

OTHER PUBLICATIONS

Restriction Requirement dated Jan. 23, 2019, U.S. Appl. No. 15/944,512, filed Apr. 3, 2018.

(Continued)

*Primary Examiner* — Quoc Thai N Vu (57) ABSTRACT

A method of tuning a subscriber travel route building engine. The method comprises presenting a user interface that is configured to receive a location cluster radius parameter input by a tuning application executing on a computer system, configuring the location cluster radius parameter input by the tuning application into a location cluster radius parameter of a route building engine application, causing by the tuning application the route building engine application to execute and determine a count of intersections of routes of mobile communication devices with a point of interest based on the location cluster radius parameter, receiving information about the count of intersections of the routes of mobile communication devices with the POI from the route building engine application by the tuning application, and presenting the information about the count of intersections in the user interface by the tuning application, whereby the route building engine is iteratively tuned.

20 Claims, 4 Drawing Sheets

(56) References Cited

U.S. PATENT DOCUMENTS

| | | |
|---|---|---|
| 2009/0150217 A1 | 6/2009 | Luff |
| 2009/0319177 A1 | 12/2009 | Khosravy et al. |
| 2010/0094867 A1 | 4/2010 | Badros et al. |
| 2010/0279708 A1 | 11/2010 | Lidsrom et al. |
| 2012/0008526 A1 | 1/2012 | Borghei |
| 2012/0040637 A1 | 2/2012 | Wigren |
| 2013/0267255 A1 | 10/2013 | Liu et al. |
| 2014/0122220 A1 | 5/2014 | Bradley et al. |
| 2015/0029176 A1* | 1/2015 | Baxter .............. G06T 15/00 345/419 |
| 2015/0051829 A1 | 2/2015 | Gearhart et al. |
| 2015/0081617 A1 | 3/2015 | Shaik et al. |
| 2015/0088423 A1 | 3/2015 | Tuukkanen |
| 2015/0106011 A1 | 4/2015 | Nesbitt |
| 2015/0149285 A1 | 5/2015 | Schroeter |
| 2015/0201298 A1 | 7/2015 | Zhang et al. |
| 2016/0076908 A1 | 3/2016 | Pang et al. |
| 2016/0330589 A1 | 11/2016 | Tuukkanen |
| 2016/0367899 A1 | 12/2016 | Boncyk |
| 2017/0153113 A1 | 6/2017 | Gotoh et al. |
| 2017/0187788 A1 | 6/2017 | Botea et al. |
| 2017/0213240 A1 | 7/2017 | Waldron et al. |
| 2017/0223497 A1 | 8/2017 | Wang |
| 2017/0277716 A1 | 9/2017 | Giurgiu et al. |
| 2018/0240026 A1 | 8/2018 | Pietrobon et al. |
| 2018/0259356 A1 | 9/2018 | Rolf et al. |
| 2018/0266829 A1* | 9/2018 | Fritz .............. G01C 21/20 |
| 2018/0283896 A1 | 10/2018 | Piemonte et al. |

OTHER PUBLICATIONS

FAIPP Pre-Interview Communication dated May 28, 2019, U.S. Appl. No. 15/944,512, filed Apr. 3, 2018.

Notice of Allowance dated Jul. 10, 2019, U.S. Appl. No. 15/944,512, filed Apr. 3, 2018.

FAIPP Pre-Interview Communication dated Aug. 28, 2019, U.S. Appl. No. 16/398,258, filed Apr. 29, 2019.

Dannamaneni, Prashanth, et al., "Mobile Phone Mobile Viewshed Analysis," filed Apr. 3, 2018, U.S. Appl. No. 15/944,512.

Burcham, Robert H., et al., "Adapting Content Presentation Based on Mobile Viewsheds," filed Dec. 11, 2017, U.S. Appl. No. 15/838,016.

Bobe, Brooke M., et al., "Mobile Communication Device Locations Data Analysis Supporting Build-Out Decisions", filed Apr. 9, 2019, U.S. Appl. No. 16/379,774.

Burcham, Robert H., et al. "Point of Interest (POI) Definition Tuning Framework" filed Apr. 29, 2019, U.S. Appl. No. 16/398,258.

Burcham, Robert H., et al., "System and Method of Mobile Phone Location in a Subway Transit Environment," filed Apr. 9, 2019, U.S. Appl. No. 16/379,791.

Burcham, Robert H., et al., "Pre-processing of Mobile Communications Device Geolocations According to Travel Mode in Traffice Analysis," filed Apr. 9, 2019, U.S. Appl. No. 16/379,784.

Burcham, Robert H., et al., "Transformation of Point of Interest Geometries to Lists of Route Segments in Mobile Communication Device Traffic Analysis," filed Apr. 9, 2019, U.S. Appl. No. 16/379,786.

Burcham, Robert H., et al., "Pattern Matching in Point-of-Interest (POI) Traffic Analysis," filed Apr. 9, 2019, U.S. Appl. No. 16/379,789.

Burcham, Robert H., et al., "System and Method of Mobile Phone Location in a Subway Transit Environment," filed Apr. 9, 2019, U.S. Appl. No. 16/379,781.

Faipp Pre-Interview Communication dated Jan. 28, 2020, U.S. Appl. No. 15/838,016, dated Dec. 11, 2017.

Restriction Requirement dated Feb. 21, 2020, U.S. Appl. No. 15/838,016, dated Dec. 11, 2017.

Notice of Allowance dated Jan. 17, 2020, U.S. Appl. No. 16/379,786, dated Apr. 9, 2019.

Notice of Allowance dated Feb. 18, 2020, U.S. Appl. No. 16/379,798, dated Apr. 9, 201.

Burcham, Robert H., et al., "Pre-processing of Mobile Communications Device Geolocations According to Travel Mode in Traffice Analysis," dated Dec. 13, 2019, U.S. Appl. No. 16/714,277.

* cited by examiner

ROUTE BUILDING ENGINE TUNING FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Location data for mobile communication devices may be obtained by the devices themselves locating themselves, for example by capturing latitude-longitude coordinates from a GPS receiver of the devices, and provided to a data store. Alternatively, location data for mobile communication devices may be determined by multilateration or trilateration of signal strength data collected by cell sites in a wireless communication network. The location data for mobile communication devices can be used as a proxy for the location of human beings, e.g., the users of the mobile communication devices. The location data can be analyzed and used for a variety of purposes including managing traffic flows on roadways, locating government branch offices, building out wireless radio access networks, and other purposes.

SUMMARY

In an embodiment, a wireless communication subscriber travel route building engine tuning framework is disclosed. The tuning framework comprises a processor, a data store comprising a plurality of location data for each of a plurality of mobile communication devices, a non-transitory memory, a route building engine application stored in the non-transitory memory, and a tuning application stored in the non-transitory memory. The route building application, when executed by the processor, analyzes mobile communication device location data accessed from the data store, where the analysis is based on a plurality of cluster radius parameters and each cluster radius parameter is associated with a delimited area, to determine a plurality of clusters of locations of each mobile communication device. The route building application, for each of a plurality of mobile communication devices, determines a route of the mobile communication device based on the clusters and determines a count of intersections of the routes of the plurality of mobile communication devices with a point of interest (POI). The tuning application, when executed by the processor, provides a user interface that is configured to receive a cluster radius parameter control input, configures the received cluster radius parameter control input into the cluster radius parameter of the route building application, causes the route building application to execute, and presents in the user interface information about the count of intersections of the routes of the plurality of mobile communication devices with a POI, whereby the route building engine is iteratively tuned by repeatedly executing the route building engine application and the tuning application.

In another embodiment, a method of tuning a subscriber travel route building engine is disclosed. The method comprises presenting a user interface that is configured to receive a location data sampling frequency parameter control input by a tuning application executing on a computer system and configuring the location data sampling frequency parameter control input by the tuning application into a location data sampling frequency parameter of a route building engine application. The method further comprises causing by the tuning application the route building engine application to execute and determine a count of intersections of routes of mobile communication devices with a point of interest (POI) based at least in part on the location data sampling frequency parameter, receiving information about the count of intersections of the routes of mobile communication devices with the POI from the route building engine application by the tuning application, and presenting the information about the count of intersections in the user interface by the tuning application, whereby the route building engine is iteratively tuned by repeatedly performing the actions of the method.

In yet another embodiment, a method of tuning a subscriber travel route building engine is disclosed. The method comprises presenting a user interface that is configured to receive a location cluster radius parameter control input by a tuning application executing on a computer system and configuring the location cluster radius parameter control input by the tuning application into a location cluster radius parameter of a route building engine application. The method further comprises causing by the tuning application the route building engine application to execute and determine a count of intersections of routes of mobile communication devices with a point of interest (POI) based at least in part on the location cluster radius parameter, receiving information about the count of intersections of the routes of mobile communication devices with the POI from the route building engine application by the tuning application, and presenting the information about the count of intersections in the user interface by the tuning application, whereby the route building engine is iteratively tuned by repeatedly performing the actions of the method.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Location data of mobile communication devices can serve as a proxy for the location of human beings who use those mobile communication devices, and that location data can be analyzed in a variety of useful ways. Location data may be referred to as location fixes herein. The location fixes of a mobile communication device can be analyzed to determine clusters of locations and a centroid of each cluster can be determined for those clusters. The centroid can represent the position of the mobile communication device or associated user or wireless communication service subscriber. For example, while a subscriber is at work, a plurality of location fixes of the device may be captured, where each of the location fixes may vary slightly from the others in location yet generally be within a small geographical area. The small geographical area corresponds to the cluster, and the centroid corresponds to a putative single location within that geographical area that is deemed to represent the location of the mobile communication device. The centroid may be a weighted center of the location fixes, e.g., an average of the positions.

The centroids of location clusters of a mobile communication device may be analyzed to infer movements of the device and positions of the device at different times of day. In an embodiment, the centroids of the location clusters of a mobile communication device may be associated to travel routes (e.g., highways, interstates, subway routes, footpaths, light rail routes), and the subscriber imputed to specific travel along those travel routes at specific times. This same analysis of location fixes, location clusters, centroids, and routes can be performed for a large number of mobile communication devices. This analysis can be used to evaluate business plans for establishing or moving businesses, to evaluate where to locate government offices such as a satellite office of the department of motor vehicles, to evaluate the value of presentation assets (e.g., digital billboards) proximate to routes, to evaluate marketing plans, to evaluate highway construction and configuration plans, and other projects. For further details on determining location centroids of mobile communication devices and using the location centroids to locate subscribers along routes, see U.S. patent application Ser. No. 15/838,016, filed Dec. 11, 2017, titled "Adapting Content Presentation Based on Mobile Viewsheds," by Robert H. Burcham, et al, and U.S. patent application Ser. No. 15/944,512, filed Jun. 29, 2018, titled "Mobile Phone Mobile Viewshed Analysis," by Prashanth Dannamaneni, et al, both of which are incorporated by reference herein in their entireties.

The present disclosure discloses providing a tuning application or tuning tool that can be used to tune operating parameters of a route building engine. In some contexts, the route building engine may be referred to as a route building application. For example, the tuning application may provide a user interface that allows a user to change parameter settings of the route building engine, to launch execution of the provisionally reconfigured route building engine to analyze location data, determine clusters, calculate centroids, associate centroids to routes, and to compare the results obtained thereby against one or more independent sources of route information to evaluate the quality of the provisional tuning. The user can repeat this process iteratively to improve the tuning, possibly trading off improvement in one quality metric of the tuning against degradation in a different quality metric of the tuning. Once a user is satisfied with the tuning configuration, this approved tuning configuration can be provisioned into a production route building engine for use in production location data analysis and route building analysis. Different operating parameters are configured for use in different areas. For example, a first set of operating parameters may be configured in the route building engine for use in analyzing a first set of location data associated with a first region, and a second set of operating parameters may be configured into the route building engine for use in analyzing a second set of location data associated with a second region.

The tuning of route building engine parameters by the tuning application comprises evaluating different sets of operating parameters for different areas, to make the route building engine perform more optimally in the areas of interest. Initially, the route building engine may be configured with default parameter values that will continue to be used unless reconfigured by tuning procedures. These default parameter values may reflect a gross level of parameter tuning. For example, the operating regions of the United States may be partitioned into rural regions, suburban regions, and urban regions, and a different set of default parameter values may be provisioned into the route building engine for regions based on their membership in one of these gross tuning categories. Some users of the production route building engine may have special interests in specific areas, such as in an ultra-dense urban area such as Times Square in New York City. They can start their tuning activities with those default parameters in place and tune one or more of the parameters, for their specific area of interest, to bring the quality metrics, or other metrics, into accord with their objectives.

An area of interest may be referred to as a point of interest (POI). A user of the production route building engine may have one POI within a delimited area or a plurality of POIs within the delimited area. The delimited area may be referred to as a tile in some contexts. The delimited areas may be bigger in some regions and smaller in other regions, for example, bigger in a rural area and smaller in an urban area. The spatial extent of the delimited areas may vary with reference to a density of POIs rather than with reference to rural, suburban, or urban classifications. A delimited area may enclose an area of about ¼ square mile, about 5 square miles, about 16 square miles, about 40 square miles, about 100 square miles, or some other area.

One of the parameters of the route building engine that can be varied is a cluster radius. In clustering location fixes, changing the cluster radius varies how many location fixes are generally included in the clusters and also how many clusters there may be. A larger cluster radius implies fewer clusters and more location fixes within each cluster, all other things being equal. A smaller cluster radius implies more clusters with fewer location fixes within each cluster. A default cluster radius may be configured into the route building engine based on whether the area is a rural area, a suburban area, or an urban area.

Another parameter of the route building engine that can be varied is a time filter parameter that determines how often location data is sampled. For example, the route building engine may filter location data samples (i.e., location fix data samples) to include no more than one location data sample per one minute interval. This time filter parameter can be varied to restrict analysis of location data to one location data sample per five minute time interval or to restrict analysis of location data to one location data sample per ten second time interval. Varying this time filter parameter can allow for tuning of the computational expense of executing the route building engine. A user may vary the time filter parameter while monitoring quality metrics and increase the time interval for sampling up to a point where the quality metrics begin to drop below a threshold quality value. This promotes reducing computational costs and increasing the speed with which results can be obtained from the route building engine. The tuning of the time filter parameter can be looked at from a different but related perspective, the perspective of retaining more location data rather than less by reducing the time filter parameter value whereby to obtain increased data resolution.

In different situations, tuning parameters may desirably be set differently. For example, in a first area a location data sampling frequency tuning parameter may be sensitive and it may be preferred to tune the value of this parameter to a value different from a default value for the sampling frequency while it may be acceptable to use a default value for a cluster radius. In a second area the cluster radius parameter may be sensitive and it may be preferred to tune the value of the location cluster radius to a value different from a default value for the cluster radius while it may be acceptable to use a default value for the location data sampling frequency.

The tuning may be performed repeatedly or iteratively to steer the results produced by the route building engine and/or the results of analysis of intersections of routes traveled by mobile communication devices with POIs. The results may be steered to cause the results to match to expected results. The expected results may be determined by an experienced craft person. The expected results may be determined based on authoritative data, such as government data regarding traffic on public roads, such as attendance counts produced by sports venues, such as counts of commuters using light rail produced by a light rail system operator, such as counts of commuters using a subway produced by a subway system operator. Authoritative data may be created by conducting a survey of traffic at a given location. Once the route building engine has been tuned to produce results that mesh with the authoritative data, the route building engine may be allowed to run freely with the assumption that the results will continue to track and mesh with authoritative results, even if these authoritative results are not available.

Figure 1:
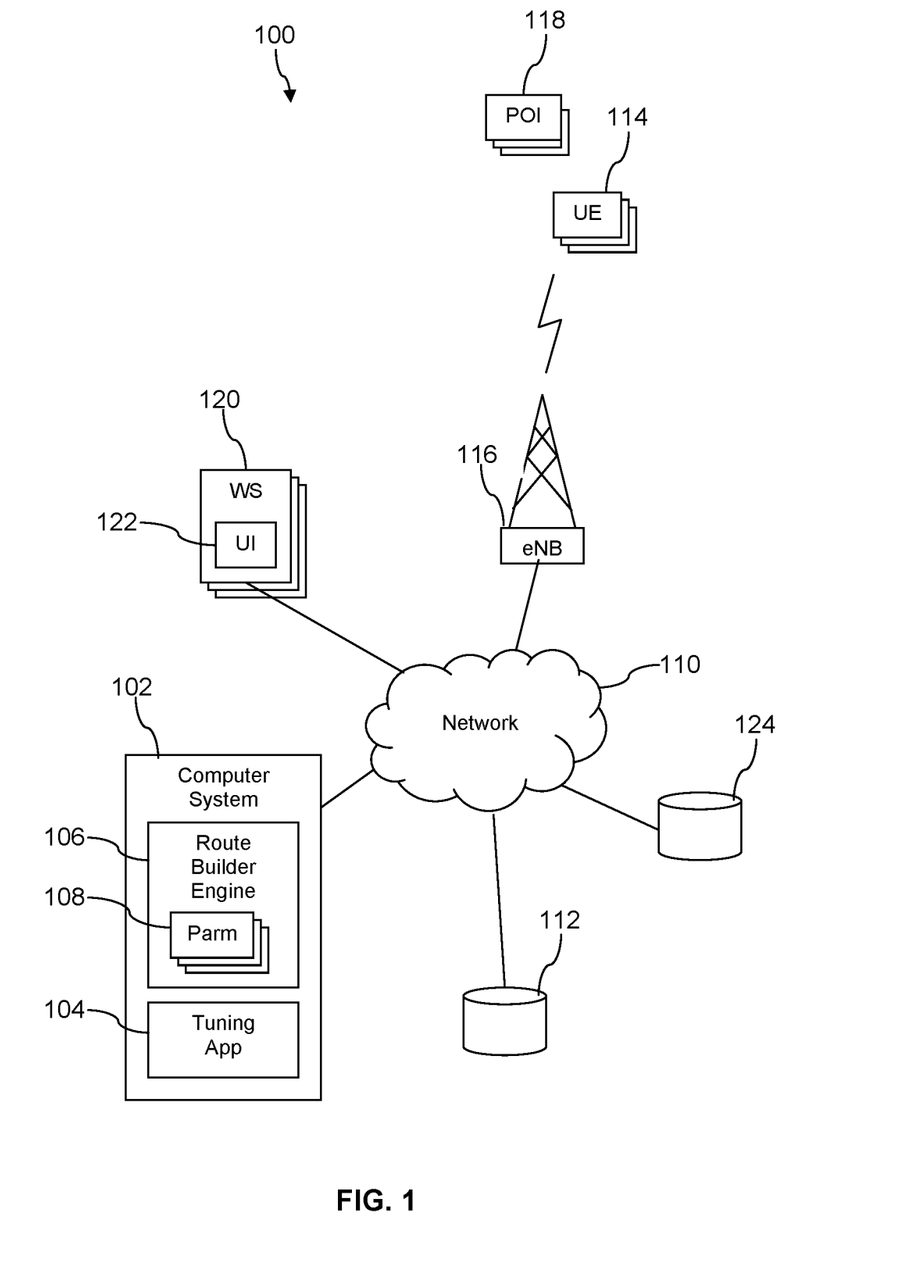
FIG. 1 is a block diagram of a route building engine tuning framework according to an embodiment of the disclosure.

Turning now to FIG. 1, a system 100 is described. The system 100 comprises a computer system 102 that comprises a tuning application 104 and a route builder engine 106, where the route builder engine 106 is configured with a plurality of parameter values 108. The computer system 102 is communicatively coupled to a network 110 and therethrough to a device location data store 112. The network comprises one or more public networks, one or more private networks, or a combination thereof. The device location data store 112 stores location data or location fixes associated with mobile communication devices 114 (user equipments: UE).

The mobile communication devices 114 may receive wireless communication links from one or more cell site 116 that are communicatively coupled to the network 110 and provide wireless communication connectivity to the mobile communication devices 114 according to one of a long term evolution (LTE), a code division multiple access (CDMA), a global system for mobile communications (GSM), or a worldwide interoperability for microwave access (WiMAX) wireless communication protocol. The mobile communication devices 114 are any of a mobile phone, a smart phone, a personal digital assistant (PDA), a wearable computer, a headset computer, a laptop computer, a tablet computer, or a notebook computer. The mobile communication devices 114 may be located, at least temporarily, proximate to one of a plurality of points of interest (POI) 118. A plurality of work stations 120 are communicatively coupled to the network 110. Each work station 120 is able to present a user interface 122 of the tuning application 104, for example a web page interface. A user can employ the user interface 122 to invoke the tuning application 104 and adapt the parameters 108 of the route builder engine 106.

When the tuning application 104 is invoked from the UI 122, the user may select regions and/or POIs 118 and then configure one or more parameters 108 for the selected regions. The user can configure parameters on each different region or POI 118 separately or configure the same set of parameters into a plurality of selected regions or POIs 118 at the same time. After configuring parameters 108, the user can use the UI 122 to cause the route builder engine 106 to execute and analyze location data stored in the device location data store 112. The user may command the route builder engine 106 to execute and analyze only location data associated with the selected regions. After completing execution, the route builder engine 106 produces results that the tuning application 104 processes and presents to the user interface 122.

The presentation of results may include comparing results produced by the route building application 106 to relevant data drawn from other sources, such as from one or more data store 124. For example, government highway traffic statistics breaking down traffic on a route into hourly intervals (e.g., number of vehicles eastbound during an hour on a given highway) may be read from the data store 124. This relevant data drawn from other sources may be referred to as authoritative data. For example, attendance figures from a professional sports team at a POI 118. For example, toll gate statistics provided by private toll road operators. These comparisons may be used to adjust offsets between reliable statistics that are not strictly equivalent. For example, the route builder application 106 provides counts of subscribers on routes, while vehicle statistics provide counts of vehicles that may contain more than one subscriber. As an example offset, on average 1.3 wireless communication service subscribers may be located in every vehicle (said in another way, 1 out of about every three vehicles may have 2 people in them). In an embodiment, authoritative data may be determined by conducting a survey. For example, college students may be hired to stand at the POI and mark a count on a clipboard for every vehicle which passes. The college students may further count occupants of vehicles as they pass the POI. Such surveys may be tedious and expensive but they may provide desirable details that otherwise may be lacking in some circumstances.

The comparison of results produced by the route building application 106 to authoritative data can be used to adapt the parameters 108. After changing the parameters 108, the user interface 122 can command the tuning application 104 to cause the route builder engine 106 to execute again, using the new parameters 108, and present the results compared to authoritative data again. In this way, the user of the user interface 122 can iteratively tune the parameters 108 and the route builder engine 106 to the desired level of performance. In an embodiment, the user interface 122 may be accessed by consumers of mobile communication device location analysis services, and the production route builder engine 106 may be executed by a proprietary business entity for hire for those consumers. In an example, the consumers may be owners of out-of-home advertising assets such as owners of billboards, and the proprietary business entity may be a wireless communication service provider that collects mobile communication device location data and stores the location data in the device location data store 112.

Figure 2:
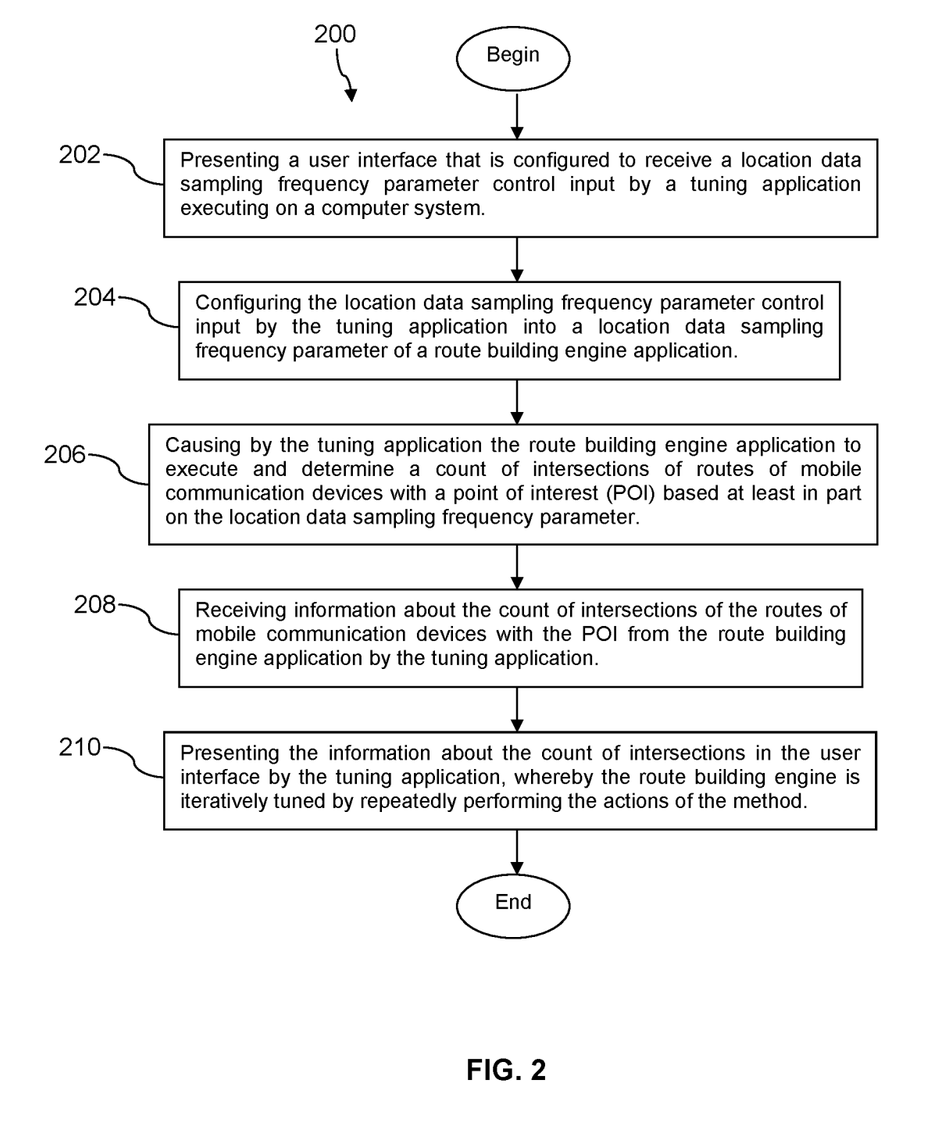
FIG. 2 is a flow chart of a method according to an embodiment of the disclosure.

Turning now to FIG. 2, a method 200 is described. The method 200 may be performed by the tuning application 104 executing on the computer system 102 to tune the route builder engine 106. At block 202, the method 200 comprises presenting a user interface that is configured to receive a location data sampling frequency parameter control input by a tuning application executing on a computer system. At block 204, the method 200 comprises configuring the location data sampling frequency parameter control input by the tuning application into a location data sampling frequency parameter of a route building engine application.

At block 206, the method 200 comprises causing by the tuning application the route building engine application to execute and determine a count of intersections of routes of mobile communication devices with a point of interest (POI) based at least in part on the location data sampling frequency parameter. The POI may be defined by input provided via the user interface. The POI may be a location identified in the tuning application. At block 208, the method 200 comprises receiving information about the count of intersections of the routes of mobile communication devices with the POI from the route building engine application by the tuning application.

At block 210, the method 200 comprises presenting the information about the count of intersections in the user interface by the tuning application, whereby the route building engine is iteratively tuned by repeating the processing of blocks 202 through 210. Said in other words, the processing of blocks 202 through 210 is performed once and a result of the tuning is presented in a first count of intersections. This first count of intersections is compared to an expectation, and the parameter or parameters of the route building engine are adjusted accordingly. The processing of blocks 202 through 210 is performed a second time and the result of the second tuning is presented in a second count of intersections. This second count of intersections is compared against the expectation of counts, and the parameter or parameters of the route building engine are adjusted again accordingly. This process can be repeated as often as desired to tune the route building engine to produce the expected count. It is noted that at least some of the same input data (e.g., location fixes and/or location data associated with mobile communication devices) may be used in block 206 during each iteration.

The expected count may be determined by a craft person. The expected count may be determined based on authoritative relevant information such as government traffic counts for a section of road or such as attendance figures released by a sports venue. The expected count may be determined based on a subway operator count of commuters passing through the subways. The expected count may be determined based on a light rail operator count of commuters using the light rail lines.

Figure 3:
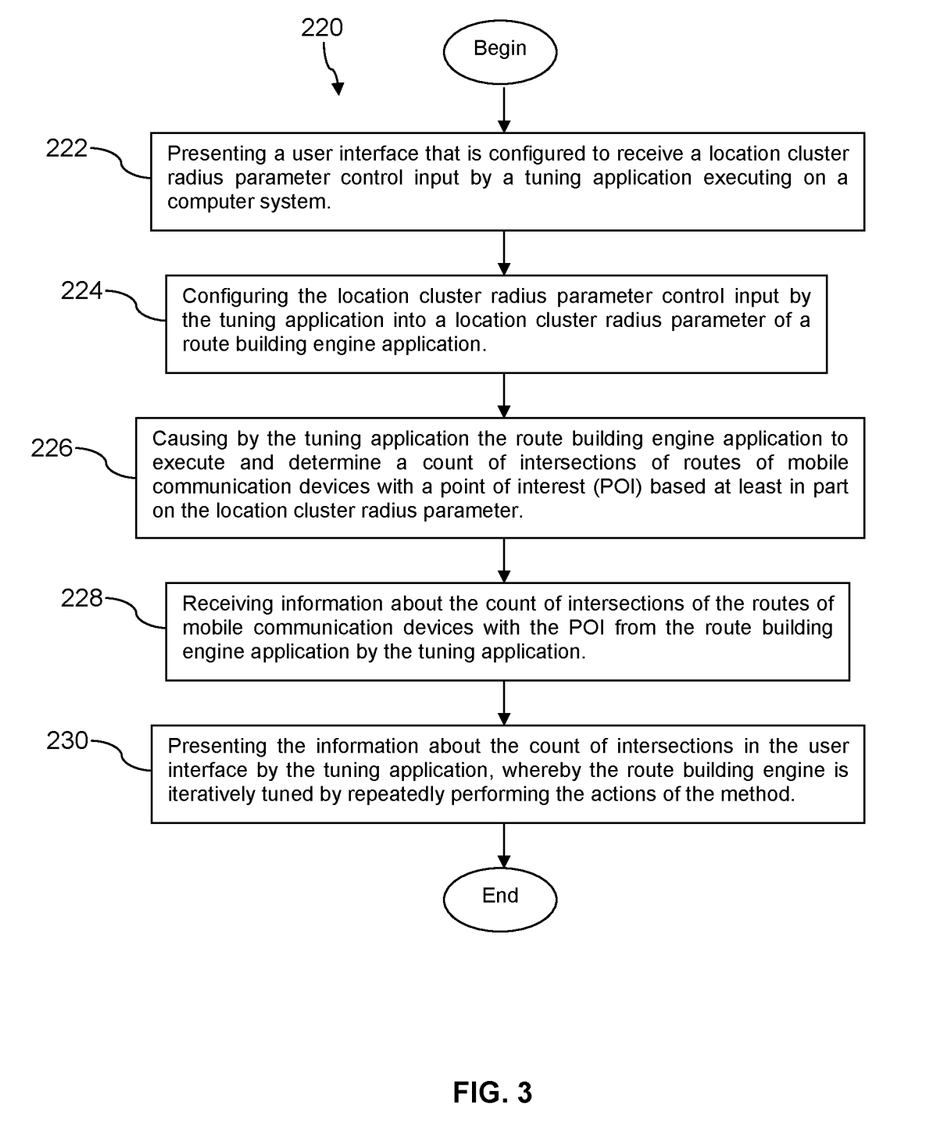
FIG. 3 is a flow chart of another method according to an embodiment of the disclosure.

Turning now to FIG. 3, a method 220 is described. The method 220 may be performed by the tuning application 104 executing on the computer system 102 to tune the route builder engine 106. At block 222, the method 220 comprises presenting a user interface that is configured to receive a location cluster radius parameter control input by a tuning application executing on a computer system. At block 224, the method 220 comprises configuring the location cluster radius parameter control input by the tuning application into a location cluster radius parameter of a route building engine application.

At block 226, the method 220 comprises causing by the tuning application the route building engine application to execute and determine a count of intersections of routes of mobile communication devices with a point of interest (POI) based at least in part on the location cluster radius parameter. At block 228, the method 220 comprises receiving information about the count of intersections of the routes of mobile communication devices with the POI from the route building engine application by the tuning application. At block 230, the method 220 comprises presenting the information about the count of intersections in the user interface by the tuning application, whereby the route building engine is iteratively tuned by repeating the processing of blocks 222 through 230 one or more times. The tuning (e.g., the adjusting of one or more parameters of the route building engine application) may be performed based on comparing the counts of intersections at the conclusion of each tuning iteration to an expected count of intersections. It is noted that at least some of the same input data (e.g., location fixes and/or location data associated with mobile communication devices) may be used in block 226 during each iteration.

Figure 4:
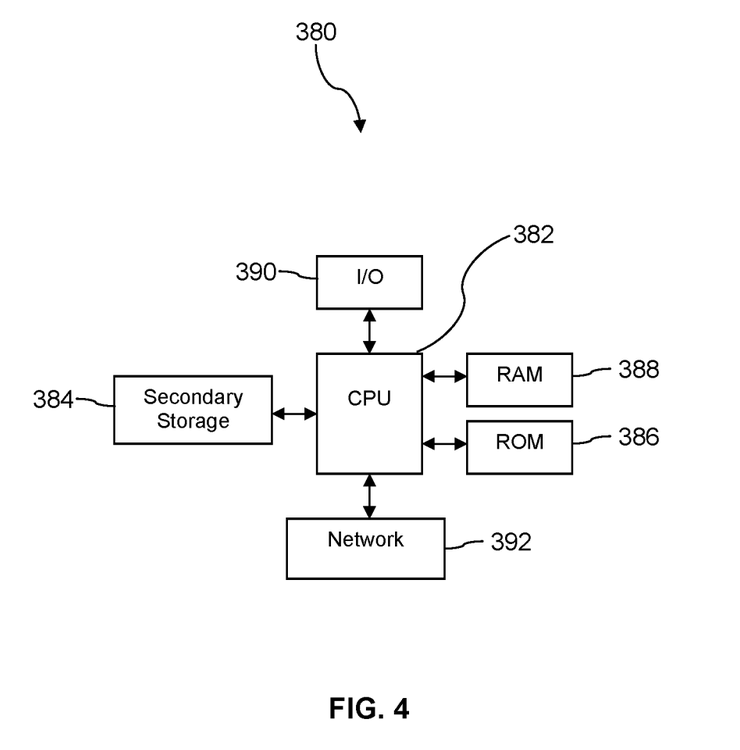
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless communication subscriber travel route building engine tuning framework, comprising:
  a processor;
  a data store comprising a plurality of location data for each of a plurality of mobile communication devices;
  a non-transitory memory;
  a route building engine application stored in the non-transitory memory that, when executed by the processor,
    analyzes mobile communication device location data accessed from the data store, where the analysis is based on a plurality of cluster radius parameters and each cluster radius parameter is associated with a delimited area, to determine a plurality clusters of locations of each mobile communication device,
    for each of a plurality of mobile communication devices, determines a route of the mobile communication device based on the clusters, and
    determines a count of intersections of the routes of the plurality of mobile communication devices with a point of interest (POI);
  a tuning application stored in the non-transitory memory that, when executed by the processor,
    provides a user interface that is configured to receive a cluster radius parameter control input,
    configures the received cluster radius parameter control input into the cluster radius parameter of the route building application,
    causes the route building application to execute, and
    presents in the user interface information about the count of intersections of the routes of the plurality of mobile communication devices with a POI, whereby the route building engine is iteratively tuned by repeatedly executing the route building engine application and the tuning application.

2. The tuning framework of claim 1, wherein the tuning application further presents information about the count of intersections compared to authoritative data.

3. The tuning framework of claim 2, wherein the tuning application reads the authoritative data from a data store of government highway traffic statistics.

4. The tuning framework of claim 2, wherein the tuning application reads the authoritative data from a professional sports team attendance data store.

5. The turning framework of claim 2, wherein the user interface provided by the tuning application is configured to receive a revised cluster radius parameter control input based on the information about the count of intersections compared to authoritative data, and wherein the tuning application when executed by the processor:
  configures the revised cluster radius parameter control input into the cluster radius parameter of the route building application,
  causes the route building application to execute and determine a count of intersections of routes of mobile communication devices with the POI based at least in part on the revised cluster radius parameter control input, and
  presents in the user interface information about the count of intersections of the routes of the plurality of mobile communication devices with the POI determined based on the revised cluster radius parameter control input.

6. The tuning framework of claim 2, wherein the tuning application reads the authoritative data from a data store of toll gate statistics.

7. The tuning framework of claim 1, wherein the user interface provided by the tuning application is configured to receive a data sample frequency control input and to configure the data sample frequency input into a data sample frequency parameter of the route building engine application.

8. The tuning framework of claim 7, wherein the route building engine application determines the count of intersections of routes of mobile communication devices with the POI based at least in part on the location data sampling frequency parameter.

9. The tuning framework of claim 8, wherein the route building engine application selects the mobile communication device location data to be analyzed based at least in part on the location data sampling frequency parameter.

10. The tuning framework of claim 8, wherein the tuning application further presents information about the count of intersections compared to authoritative data.

11. The tuning framework of claim 10, wherein the tuning application reads the authoritative data from one or more of a data store of government highway traffic statistics, a professional sports team attendance data store, or a data store of toll gate statistics.

12. The tuning framework of claim 10, wherein the user interface provided by the tuning application is configured to receive a revised data sample frequency control input based on the information about the count of intersections compared to authoritative data, and wherein the tuning application when executed by the processor:
configures the revised data sample frequency control input into the data sample frequency parameter of the route building application,
causes the route building application to execute and determine a count of intersections of routes of mobile communication devices with the POI based at least in part on the revised data sample frequency control input, and
presents in the user interface information about the count of intersections of the routes of the plurality of mobile communication devices with the POI determined based on the revised data sample frequency control input.

13. The tuning framework of claim 1, wherein the user interface is configured to receive an identification of a delimited area associated with the cluster radius parameter control input and wherein configuring the received cluster radius parameter control input into the cluster radius parameter of the route building application comprises configuring the cluster radius parameter for the delimited area identified by the input.

14. The turning framework of claim 13, wherein the user interface provided by the tuning application is configured to receive a different cluster radius parameter control input for a different delimited area, and wherein the tuning application when executed by the processor:
configures the different cluster radius parameter control input into a cluster radius parameter of the route building application for the different delimited area,
causes the route building application to execute and determine a count of intersections of routes of mobile communication devices with a different POI based at least in part on the different cluster radius parameter control input, and
presents in the user interface information about the count of intersections of the routes of the plurality of mobile communication devices with the different POI determined based on the different cluster radius parameter control input.

15. The tuning framework of claim 14, wherein the tuning application further presents information about the count of intersections of routes of mobile communication devices with the different POI compared to authoritative data.

16. The tuning framework of claim 15, wherein the tuning application reads the authoritative data from one or more of a data store of government highway traffic statistics, a professional sports team attendance data store, or a data store of government highway traffic statistics.

17. The tuning framework of claim 1, wherein the mobile communication devices are selected from the group consisting of a mobile phone, a smart phone, a personal digital assistant (PDA), a wearable computer, a headset computer, a laptop computer, a tablet computer, and a notebook computer.

18. The tuning framework of claim 1, wherein the tuning application further presents information about authoritative data in the user interface.

19. The tuning framework of claim 18, wherein the tuning application reads the authoritative data from one or more of a data store of government highway traffic statistics, a professional sports team attendance data store, or a data store of toll gate statistics.

20. The method of claim 1, wherein the route building engine application determines centroids of the clusters and determines routes of mobile communication devices based on the centroids.

* * * * *